United States Patent Office 3,277,063
Patented Oct. 4, 1966

3,277,063
SELECTED α- AND β-(PERFLUOROALKYLTHIO) ACRYLIC ACID DERIVATIVES
John F. Harris, Jr., Wilmington, Del., assignor to E. I. du Pont de Nemours and Company, Wilmington, Del., a corporation of Delaware
No Drawing. Filed July 30, 1965, Ser. No. 476,139
15 Claims. (Cl. 260—79.7)

This application is a continuation-in-part of my copending application Serial No. 194,159, filed May 11, 1962, now abandoned.

This invention relates to, and has as its principal objects provision of, novel and useful ethylenically unsaturated monomers containing fluorine and sulfur and homopolymers of such monomers.

The novel ethylenically unsaturated monomers of this invention are substituted acrylic acid compounds of the formula:

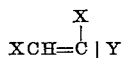

wherein one X is perfluoroalkylthio ($R_fS$) and the other is hydrogen, halogen of atomic number of at least 17 (i.e., Cl, Br, or I), hydrocarbon, halohydrocarbon, alkoxyhydrocarbon, or cyanohydrocarbon, and Y is —COF, —COBr, —COCl, —COI, —CN, —CONH$_2$, —CONHR, or —CONR$_2$, where R is hydrocarbon or halohydrocarbon. Compounds of the above general formula in which the perfluoroalkyl group contains up to 10 carbon atoms, any hydrocarbon or substituted hydrocarbon group is alkyl, aryl, cycloalkyl, halogenated aryl, alkoxyaryl or cyanoaryl having up to 10 carbon atoms, and any monovalent hydrocarbon radical R is alkyl, cycloalkyl or aryl of up to 10 carbon atoms having an especially useful combination of properties and are therefore preferred.

The monomeric (perfluoroalkylthio)acrylic compounds of this invention can be polymerized to useful homopolymers which are also part of the invention. The α-(perfluoroalkylthio)acrylic compounds are especially susceptible to homopolymerization; they polymerize spontaneously, and in the presence of ultraviolet light. The monomeric (perfluoroalkylthio)acrylic acid compounds can be stored at low temperatures, e.g., at temperatures of —76° C. or lower. The compounds can also be stored by addition of an antioxidant, e.g., hydroquinone, to the monomeric compounds.

The products of this invention can be prepared by various methods, the particular method employed in any given case being dependent on the particular (perfluoroalkylthio)acrylic acid compound wanted. The esters of β-(perfluoroalkylthio)acrylic acid, i.e., compounds of the formula

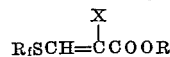

wherein the symbols have the meanings given hereinbefore, are precursors of some of the products of the invention and they can be prepared by irradiating with ultraviolet light a mixture of equimolar parts of a perfluoroalkanethiol and an ester of propiolic acid, preferably an alkyl ester, for a period of several hours, e.g., 10–30 hours. The resulting ester of β-(perfluoroalkylthio)acrylic acid can be isolated form the reaction mixture by fractional distillation.

The esters of α-(perfluoroalkylthio)acrylic acid, i.e., compounds of the general formula

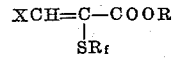

wherein the symbols have the meanings defined above, also are precursors of some of the products of the invention and they can be prepared by the dehydrohalogenation of an ester of a β-halo-α-(perfluoroalkylthio)propionic acid by means of a tertiary amine, e.g., triethylamine, in ether solution at ordinary temperature. The by-product tertiary amine hydrochloride which precipitates is removed by filtration and resulting α-(perfluoroalkylthio) acrylate can be isolated from the filtrate by fractional distillation. The starting materials for this process, i.e., the esters of β-halo-α-(perfluoroalkylthio)propionic acid, can be prepared by the ultraviolet light-catalyzed addition of a perfluoroalkanesulfenyl halide to methyl acrylate. The perfluoroalkanesulfenyl halide can in turn be prepared by known methods. For example, perfluoroalkanesulfenyl chlorides can be made by reaction of a perfluoroalkyl disulfide with chlorine as described by Haszeldine and Kidd (J. Chem. Soc. 1953, 3219). The perfluoroalkanethiol reactants can likewise be prepared by known methods. For example, perfluoropropane-1-thiol can be prepared by heating perfluoro-n-propyl iodide with sulfur at 250° C. for several hours to form the disulfide $(n-C_3F_7)_2S_2$. This disulfide is then converted to $$(n-C_3F_7)_2Hg$$

by treatment with mercury in the presence of ultraviolet light. The bis(perfluoropropyl) mercury is then treated with anhydrous HCl to produce perfluoropropane-1-thiol. This method is described in greater detail by Haszeldine and Kidd, J. Chem. Soc. 1955, 3871.

The α-(perfluoroalkylthio)acrylonitriles of this invention, i.e., compounds of the general formula

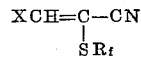

wherein X is a monovalent hydrocarbon or halogenated hydrocarbon radical, can be prepared by reaction of an aldehyde of the formula XCHO, wherein X is a monovalent hydrocarbon or halogenated hydrocarbon radical, with a (perfluoroalkylthio)acetonitrile of the formula $R_fSCH_2CN$ in an inert reaction medium, e.g., benzene, in the presence of a secondary amine, e.g., piperidine, at the temperature at which the reaction mixture refluxes. The resulting α-(perfluoroalkylthio)acrylonitrile can be isolated from the reaction mixture by conventional means, e.g., by distillation. The (perfluoroalkylthio)acetonitrile used in this process can be prepared by the dehydration of the corresponding acetamide in turn prepared from the reaction of a perfluoroalkanesulfenyl chloride with ketene followed by ammonia.

Some of the α-(perfluoroalkylthio)acrylonitriles of this invention can also be prepared by addition of a perfluoroalkanesulfenyl chloride to acrylamide in an inert solvent, e.g., acetonitrile, to form a β-chloro-α-(perfluoroalkylthio)propionamide, which in turn can be simultaneously dehydrohalogenated and dehydrated to the desired α-(perfluoroalkylthio)acrylonitrile by means of phosphorous pentoxide.

Many of the products of this invention can be converted to other products falling within the same general formula by reactions involving the conversion of one of the particular Y groups to another of the above-defined Y groups by conventional reactions. Several of these are described below.

The free acids, i.e., compounds of the formula

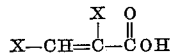

wherein the X's have the meanings defined before, can be prepared from the esters of the formula

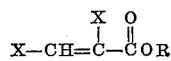

by heating the ester at reflux temperature with an aqueous solution of a strong mineral acid, e.g., hydrochloric acid, sulfuric acid, etc., for several hours, e.g., 10–50 hours. The free acid is then isolated from the organic layer of the reaction mixture by conventional methods, e.g., by fractional distillation.

The free α- or β-(perfluoroalkylthio)acrylic acid obtained as described above can be converted to the corresponding acid halide by conventional methods. Thus, the acid chloride can be prepared by treating the free acid with thionyl chloride, phosphorus trichloride, or phosphorus pentachloride at ordinary or slightly elevated temperatures. The acid fluoride can be prepared by treating the free acids with sulfur tetrafluoride. The acid bromides and iodides can be prepared from the appropriate α- or β-(perfluoroalkylthio)acrylic acid chlorides by treatment with excess hydrogen bromide or hydrogen iodide, respectively.

The amides of the α- and β-(perfluoroalkylthio)acrylic acids can be prepared from the corresponding acid halides, especially the chlorides, by treatment with dry ammonia or a primary or secondary amine in a anhydrous ether reaction medium. After removal by filtration of the ammonium or substituted ammonium hydrohalide by-product, the α- and β-(perfluoroalkylthio)acrylamides can be isolated by evaporation of the reaction medium from the filtrate.

The amide group in the α- and β-(perfluoroalkylthio) acrylamides of this invention can be converted to the nitrile group by subjecting the (perfluoroalkylthio) acrylamide to the action of phosphorus pentoxide at a temperature between 100° and 175° C.

β-(perfluoroalkylthio)acrylic acid compounds in which one of the X's in the general formula for the products of this invention is bromine can be prepared by adding to the double bond in the corresponding (perfluoroalkylthio)acrylic acid compound in which the corresponding X group is hydrogen, two atoms of bromine by means of the bromine-dioxane complex in a trichlorofluoromethane reaction medium, and then dehydrohalogenating the resulting dibromoaddition product by means of water to form the desired α-bromo-β-(perfluoroalkylthio)acrylic acid compound. This method is especially effective in preparing α-bromo-β-(perfluoroalkylthio)acrylonitriles.

As indicated above, the monomeric α-(perfluoroalkylthio)acrylic acid compounds of this invention polymerize spontaneously on standing at room temperature. After a spontaneous polymerization period of 2 to 3 weeks, viscous, liquid polymers are obtained, and after further polymerization, e.g., for periods of a few weeks more, hard solid polymers are obtained.

The rate of polymerization of the monomers of this invention is increased greatly by irradiation of the monomers with ultraviolet light, e.g., the light from a low pressure mercury resonance lamp. The rate of polymerization is also increased by use of a photoinitiator, e.g., benzoin methyl ether, during the irradiation with ultraviolet light. The homopolymers obtained by such irradiation processes very from soft, tacky polymers to hard, solid polymers. The actual time of polymerization depends on several factors, e.g., the degree of polymerization desired, the particular source of the ultraviolet light, and the distance from the polymerizing mixture to the source of ultraviolet light. Any irradiating device can be used provided the light it emits contains at least some radiation of ultraviolet or near ultraviolet wavelengths, i.e., wavelengths between about 0.015 and 0.04 micron. Commercial mercury arc sunlamps are satisfactory. The reaction vessel being employed should, of course, be transparent to ultraviolet light, or the light source should be placed inside the vessel. The concentration of photoinitiator used in these polymerizations can vary over a wide range. For example, concentrations ranging from 0.01% up to 10% or more, based on the weight of the polymerizable monomers can be used. Preferably, the photoinitiators are used in concentrations of 1–5% (by weight) of the polymerizable monomers.

The products of this invention are illustrated in further detail by the following examples in which proportions of ingredients are expressed in parts by weight unless otherwise noted.

EXAMPLE 1

*Preparation of β-(trifluoromethylthio)acrylyl chloride*

A. PREPARATION OF METHYL β-(TRIFLUOROMETHYL-THIO)ACRYLATE

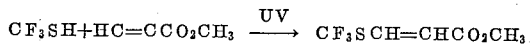

A mixture of 20 parts of methyl propiolate and 31 parts of trifluoromethanethiol in a reaction vessel fitted with a reflux condenser cooled by solid carbon dioxide is irradiated with ultraviolet light from a low pressure mercury resonance lamp for a period of 19 hours at atmospheric pressure. At the end of this period the reaction mixture is distilled through a small spinning band fractionating column and there is obtained 8.10 parts of recovered methyl propiolate and 12.93 parts of methyl β-(trifluoromethylthio)acrylate, distilling at 68–74° C./56 mm.; $n_D^{25}$, 1.4207.

*Analysis.*—Calc'd for $C_5H_5F_3O_2S$: C, 32.3%; H, 2.7%; F, 30.6%. Found: C, 32.8%; H, 3.0%; F, 31.6%.

Examination of the proton and fluorine nuclear magnetic resonance patterns of the methyl β-(trifluoromethylthio)acrylate indicates the presence of both cis and trans isomers in the ratio of 4 cis to 1 trans.

B. PREPARATION OF β-(TRIFLUOROMETHYLTHIO) ACRYLIC ACID

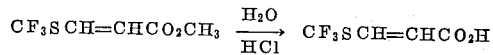

A mixture of 31.9 parts of methyl β-(trifluoromethylthio)acrylate, 71 parts of concentrated aqueous hydrochloric acid, and 240 parts of water is stirred and heated to reflux temperature for 20 hours. The mixture is then cooled, the organic layer is separated and the aqueous layer is extracted twice with 71.4-part portions of diethyl ether. The ether extract and the organic layer are combined, dried over anhydrous magnesium sulfate and distilled through a spinning band fractionating column. There are obtained 10.5 parts of recovered methyl β-(trifluoromethylthio)acrylate and 14.02 parts of β-(trifluoromethylthio)acrylic acid distilling at 61–63° C./0.35 mm. This acid solidifies to a white solid, M.P. 62–68° C.

*Analysis.*—Calc'd for $C_4H_3F_3O_2S$: C, 27.9%; H, 1.8%; F, 33.1%. Found: C, 28.1%; H, 1.7%; F, 32.3%.

C. β-(TRIFLUOROMETHYLTHIO)ACRYLYL CHLORIDE

 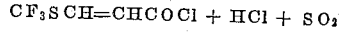

A mixture of 15.48 parts of β-(trifluoromethylthio) acrylic acid and 11.75 parts of thionyl chloride is stirred at room temperature for 18 hours and then at gentle reflux for 4.5 hours. The reaction mixture is distilled through a spinning band fractionating column and there is obtained 11.68 parts of β-(trifluoromethylthio)acrylyl chloride as a colorless liquid distilling at 47–51° C./29 mm.; $n_D^{24}$, 1.4553.

EXAMPLE 2

*Preparation of β-(trifluoromethylthio)acrylamide*

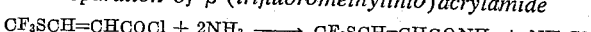

Dry ammonia is passed through a stirred and cooled solution of 11.68 parts of β-(trifluoromethylthio)acrylyl chloride in 71.4 parts of anhydrous diethyl ether until there is no further precipitation. The reaction mixture is filtered, the solid residue is rinsed on the filter with diethyl ether, and the filtrate and rinsings are combined and evaporated to dryness. There is obtained 9.88 parts of β-(trifluoromethylthio)acrylamide as a white solid melting at 95–98° C. After recrystallization from benzene, the amide melts at 102–102.5° C.

*Analysis.*—Calc'd for C₄H₄F₃NOS: S, 33.3%; N, 8.2%. Found: S, 34.1%; N, 8.0%.

EXAMPLE 3

*Preparation of α-(trifluoromethylthio)acrylyl chloride*

A. PREPARATION OF METHYL α-(TRIFLUOROMETHYL-THIO)ACRYLATE

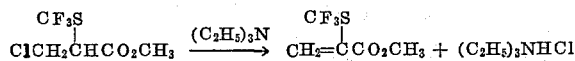

To a solution of 10 parts of methyl β-chloro-α-(trifluoromethylthio)propionate of 90% purity (prepared by the ultraviolet light-initiated addition of trifluoromethanesulfenyl chloride to methyl acrylate) in 53.5 parts of anhydrous diethyl ether is added 4.5 parts of triethylamine. The resulting mixture is stirred for 0.5 hour at room temperature and it is then filtered and the solid is rinsed on the filter with anhydrous diethyl ether. The ether solutions are combined, dried over anhydrous magnesium sulfate and distilled. There is obtained 5.06 parts (60% of theory) of methyl α-(trifluoromethylthio)acrylate distilling at 60–65° C./38 mm.; $n_D^{25}$, 1.4063.

*Analysis.*—Calc'd for C₅H₅F₃O₂S: C, 32.3%; H, 2.7%; F, 30.6%. Found: C, 32.7%; H, 2.8%; F, 30.3%.

B. PREPARATION OF α-(TRIFLUOROMETHYLTHIO) ACRYLIC ACID

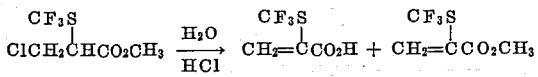

A mixture of 15 parts of methyl β-chloro-α-(trifluoromethylthio)propionate (90%), 100 parts of water, and 24 parts of concentrated hydrochloric acid is heated at reflux temperature for a period of 15 hours. The organic layer is separated and the aqueous layer is extracted once with 35.7 parts of anhydrous diethyl ether. The ether washing and the organic layer are combined, shaken once with 100 parts of water, dried over anhydrous magnesium sulfate and then distilled through a small Vigreaux still. There are obtained 0.9 part (7% of theory) of methyl α-(trifluoromethylthio)acrylate distilling at 43–49° C./17 mm.; $n_D^{25}$, 1.4054, and 5.4 parts (47% of theory) of α-(trifluoromethylthio)acrylic acid distilling at 81–86° C./4.4 mm.; $n_D^{25}$, 1.4213–1.4240.

*Analysis.*—Calc'd for C₄H₃F₃O₂S: C, 33.1%; S, 18.6%. Found: C, 33.2%; S, 17.7%.

C. α-(TRIFLUOROMETHYLTHIO)ACRYLYL CHLORIDE

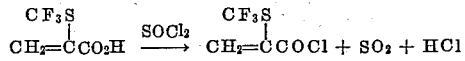

A mixture of 9 parts of thionyl chloride and 11.09 parts of α-(trifluoromethylthio)acrylic acid is stirred at room temperature for 1.5 hours and then at gentle reflux for 6.5 hours. The reaction mixture is then distilled through a small spinning band fractionating column and there is obtained 4.48 parts (36% theory) of α-(trifluoromethylthio)acrylyl chloride distilling at 50–52° C./40 mm.

EXAMPLE 4

*Preparation of α-(trifluoromethylthio)acrylamide)*

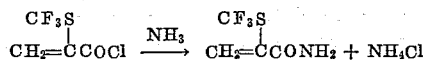

Through a solution of 3.56 parts of α-(trifluoromethylthio)acrylyl chloride in 21 parts of anhydrous diethyl ether is passed anhydrous ammonia until there is no further precipitation. The reaction mixture is filtered and the residue is rinsed with ether. The filtrate and the ether rinses are combined and evaporated to dryness. There is obtained a gummy residue of α-(trifluoromethylthio)acrylylamide which does not crystallize.

EXAMPLE 5

*Preparation of α-(trifluoromethylthio)-β-(p-chlorophenyl)acrylonitrile*

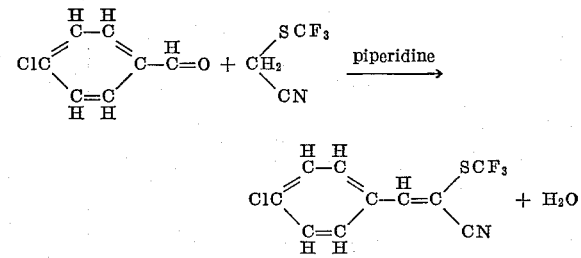

A mixture of 20 parts of p-chlorobenzaldehyde, 20 parts of (trifluoromethylthio)acetonitrile, 3 parts of piperidine and 127 parts of benzene is refluxed in a reaction vessel fitted with a water separator. After 0.5 hour, 1.5 parts of water separates. The mixture is refluxed for 1 hour longer during which no additional water separates. Twenty-six parts of benzene is added to the solution which is then extracted twice with 50-part portions of water, twice with 50-part portions of 3% hydrochloric acid and then once with 50 parts of saturated aqueous sodium bicarbonate solution. After being dried over anhydrous magnesium sulfate and filtered, the reaction mixture is distilled. There is obtained 25.3 parts (68% of theory) of α - (trifluoromethylthio)-β-(p-chlorophenyl)acrylonitrile, alternatively named 1-cyano-2-p-chlorophenylvinyl trifluoromethyl sulfide, distilling at 102° C./0.40 mm.–108° C./0.50 mm.; $n_D^{25}$, 1.5726–1.5738.

*Analysis.*—Calc'd for C₁₀H₅ClF₃NS: N, 5.3%; S, 12.2%. Found: N, 5.7%; S, 12.4%.

EXAMPLE 6

*Preparation of α-(trifluoromethylthio)-β-phenylacrylonitrile*

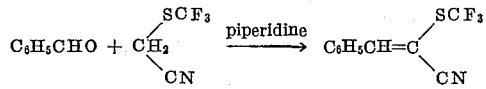

A mixture of 16 parts of benzaldehyde, 20 parts of (trifluoromethylthio)acetonitrile, 3 parts of piperidine and 127 parts of benzene is treated as described in Example 5. Distillation of the reaction mixture yields 27.06 parts (83% of theory) of α-(trifluoromethylthio)-β-phenylacrylonitrile, alternatively named 1-cyano-2-phenylvinyl trifluoromethyl sufide, distilling at 69° C./0.15 mm.; $n_D^{25}$, 1.5509.

*Analysis.*—Cal'd for C₁₀H₆F₃NS: R, 24.9%; S, 14.0%. Found: F, 25.1%; S, 13.6%.

EXAMPLE 7

*Preparation of α-(heptafluoropropylthio)-β-phenylacrylonitrile*

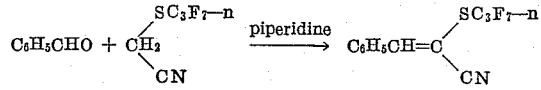

A mixture of 1.73 parts of benzaldehyde, 3.36 parts of (heptafluoropropylthio)acetonitrile, 0.3 part of piperidine and 13 parts of benzene is treated as described in Example 5. Distillation of the reaction mixture yields 2.69 parts of α-(heptafluoropropylthio)-β-phenylacrylonitrile distilling at 70–77° C./0.15 mm.; $n_D^{25}$, 1.4933.

*Analysis.*—Calc'd for C₁₂H₆F₇NS: C, 43.8%; H, 1.8%; F, 40.4%; S, 9.7%. Found: C, 44.2%; H, 2.0%; F, 39.4%; S, 9.2%.

EXAMPLE 8

*Preparation of β-(trifluoromethylthio)acrylonitrile*

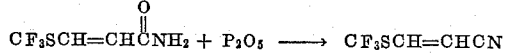

A mixture of 8.85 parts of β-(trifluoromethylthio)acrylamide and 25 parts of phosphorous pentoxide is mixed thoroughly and placed in a flask fitted with a small distilling head and receiver, and heated with an oil bath. The receiver is vented through two acetone-solid carbon dioxide-cooled traps to a water aspirator. The system is evacuated and the flask containing the reactants is heated to about 100–120° C. at which temperature material begins to distill out. Over a period of 2.5 hours the oil bath is heated to 175° C. There is obtained 6.76 parts of β-(trifluoromethylthio)acrylonitrile. A distilled sample of this product boils at 62° C./48 mm., and has a refractive index, $n_D^{25}$, 1.4203.

*Analysis.*—Calc'd for $C_4H_2F_3NS$: F, 37.2%; N, 9.1%; S, 20.9%. Found: F, 36.8%; N, 9.4%; S, 21.4%.

Examination of this material by fluorine and proton nuclear magnetic resonance spectroscopy shows the presence of both the cis and trans isomers in the approximate ratio of 3 parts of cis to 1 parts of trans.

EXAMPLE 9

*Preparation of α-bromo-β-(trifluoromethylthio)-acrylonitrile*

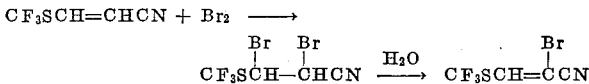

A mixture of 6 parts of p-dioxane and 37.5 parts of trichlorofluoromethane is placed in a reaction vessel equipped with a stirrer and addition funnel. While the mixture is being stirred and cooled in an ice water bath, a solution of 10.9 parts of bromine in 37.5 parts of trichlorofluoromethane is added. After presciptation of the bromine-dioxane complex is completed, a solution of 10 parts of β-(trifluoromethylthio)acrylonitrile (a mixture of cis and trans isomers) in 75 parts of trichlorofluoromethane is added during 5 minutes. After the mixture is stirred for 2 hours, 50 parts of water and 21.4 parts of diethyl ether are added. After a few additional minutes of stirring, the layers are separated and the aqueous layer is extracted with 18 parts of diethyl ether. The ether solutions are combined, shaken with 50 parts of water, dried over anhydrous magnesium sulfate and distilled. There is obtained 10 parts of α-bromo-β-(trifluoromethylthio)acrylonitrile distilling at 51–59° C./13 mm.; $n_D^{25}$, 1.4738–1.4752.

*Analysis.*—Calc'd for $C_4HBrF_3NS$: Br, 34.5%; F, 24.6%; N, 6.03%. Found: Br, 35.0%; F, 23.3%; N, 6.08%.

EXAMPLE 10

*Preparation of α-(trifluoromethylthio)arcylonitrile*

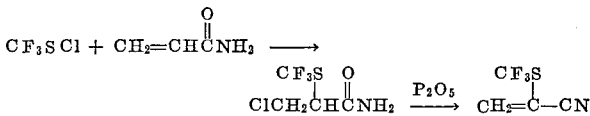

Tifluoromethanesulfenyl chloride is passed through a stirred solution of 100 parts of acrylamide and 307 parts of acetonitrile until 272 parts is absorbed. The solvent and excess trifluoromethanesulfenyl chloride are distilled off under vacuum and the liquid residue is mixed well with 430 parts of phosphorous pentoxide in a flask fitted with a small distilling head, connected through a receiver and two traps cooled with solid carbon dioxide and acetone to a water aspirator, and heated with an oil bath. The system is evacuated and the oil bath is heated slowly up to 150° C. Material begins to distill out at about 100° C. The heating is continued for 3 hours at 150–180° C. oil bath temperature. The receiver is changed and the system is evacuated by an oil pump for a few minutes. By distillation of the receiver contents and the contents of the cold traps there is obtained 10.97 parts of crude α-(trifluoromethylthio)acrylonitrile distilling at 44–73° C./43 mm. (mostly at 45° C./43 mm.) and having a refractive index, $n_D^{25}$, 1.3999. Upon redistillation of this material there is obtained pure α-(trifluoromethylthio) acrylonitrile distilling at 44° C./37 mm.; $n_D^{25}$, 1.3977.

*Analysis.*—Calc'd for $C_4H_2F_3NS$: F, 37.2%; N, 9.1%; S, 20.9%. Found: F, 37.3%; N, 9.3%; S, 21.1%.

Examination of the fluorine and proton nuclear magnetic resonance patterns of this material proves that it is different from either of the isomers of β-(trifluoromethylthio)acrylonitrile.

EXAMPLE 11

*Preparation of N,N-dimethyl-β-(trifluoromethylthio)-acrylamide*

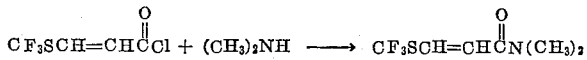

Anhydrous dimethylamine is passed through a solution of 6.36 parts of β-(trifluoromethylthio)acrylyl chloride in 36 parts of anhydrous diethyl ether until there is no more precipitation. The mixture is filtered and the filtrate is evaporated to dryness. There is obtained 3.47 parts of a solid melting at 58.5–61.5° C. After recrystallization from pentane, N,N-dimethyl-β-(trifluoromethylthio)acrylamide is obtained in the form of small colorless prisms melting at 62.5–63° C.

*Analysis.*—Calc'd for $C_6H_8F_3NOS$: C, 36.2%; H, 4.1%; S, 16.1%. Found: C, 36.7%; H, 3.7%; S, 16.1%.

EXAMPLE 12

*Preparation of N-(p-chlorophenyl)-β-(trifluoromethylthio)acrylamide*

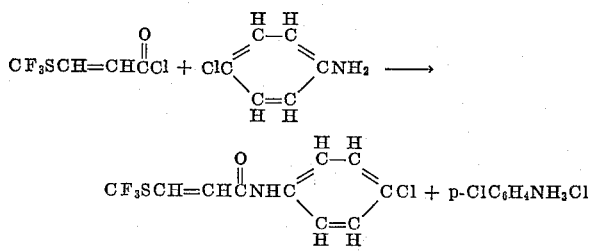

A solution of 10.96 parts of β-(trifluoromethylthio)acrylyl chloride in 29 parts of diethyl ether is added with stirring during 10 minutes to a solution of 14.7 parts of p-chloroaniline in 71 parts of ether. The mixture is stirred for an additional 15 minutes and then a large amount of water is added to dissolve the salts that are formed. The ether layer is separated, washed once with water, dried over anhydrous magnesium sulfate, filtered, and evaporated to dryness. The resulting crude N-(p-chlorophenyl)-β-(trifluoromethylthio)acrylamide is recrystallized from chloroform. The melting point of the recrystallized product is 154–157° C.

*Analysis.*—Calc'd for $C_{10}H_7ClF_3NOS$: C, 42.7%; H, 2.5%; S, 11.4%. Found: C, 43.1%; H, 3.0%; S, 11.4%.

EXAMPLE 13

*Polymerization of α-(trifluoromethylthio)acrylonitrile*

A sample of α-(trifluoromethylthio)acrylonitrile stored in a glass bottle for 3 weeks is observed to have polymerized to a solid somewhat elastic, sticky polymer. This material is spread on a glass plate and residual monomer allowed to evaporate, and a film of the polymer is formed.

EXAMPLE 14

*Polymerization of α-(trifluoromethylthio)acrylonitrile*

A sample of α-(trifluoromethylthio)acrylonitrile is irradiated with ultraviolet light from a low pressure mercury resonance lamp for a period of 18 hours. Polymerization takes place and the resulting poly[α-(trifluoromethylthio)acrylonitrile] is a viscous liquid having adhesive properties. This polymer is useful as an adhesive for paper.

The examples have illustrated the monomeric products of this invention by reference to specific α- and β-(perfluoroalkylthio)acrylic acid compounds and to specific polymers of the α-(perfluoroalkylthio)acrylic acid compounds. However, this invention includes any compound of the general formula

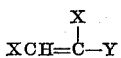

wherein X and Y have the meanings recited hereinbefore, and polymers of the α-(perfluoroalkylthio)acrylic acid compounds. Specific examples of other β-(perfluoroalkylthio)acrylic acid ester precursors and the particular perfluoroalkanethiols from which they can be prepared by reaction with propiolic acid esters using the procedure of Example 1A are listed in Table I.

TABLE I.—β-(PERFLUOROALKYLTHIO)ACRYLIC ESTER PRECURSORS

| Reactants | | Products |
| --- | --- | --- |
| Perfluoroalkanethiol | Propiolic Ester | |
| Perfluoroethanethiol | Ethyl propiolate | Ethyl β-(perfluoroethylthio)acrylate. |
| Perfluoro-1-propanethiol. | Methyl propionate | Methyl β-(perfluoro-1-propylthio)acrylate. |
| Perfluoromethanethiol. | Phenyl propiolate | Phenyl β-(perfluoromethylthio)acrylate. |
| Perfluoroethanethiol | Decyl propiolate | Decyl β-(perfluoroethylthio)acrylate. |

Similarly, when the specific β-halo-α-(perfluoroalkyl)propionates listed in Table II (and prepared from the corresponding perfluoroalkylsulfenyl halide and acrylic acid esters) are dehydrohalogenated by a tertiary amine in accordance with the process described in Example 3A, the specific α-perfluoroalkylthio)acrylate precursors listed in the second column of Table II are formed.

TABLE II.—α-(PERFLUOROALKYLTHIO)ACRYLIC ESTER PRECURSORS

| Reactants, β-Halo-α-(perfluoroalkylthio)-propionate | Products |
| --- | --- |
| Methyl β-bromo-α-(perfluoromethylthio)propionate. | Methyl α-(perfluoromethylthio)acrylate. |
| Butyl β-chloro-α-(perfluoromethylthio)propionate. | Butyl α-(perfluoromethylthio)acrylate. |
| Ethyl β-chloro-α-(perfluoropropylthio)propionate. | Ethyl α-(perfluoro-propylthio)acrylate. |
| Phenyl β-chloro-α-(perfluorobutylthio)propionate. | Phenyl α-(perfluorobutylthio)acrylate. |
| Cyclohexyl β-chloro-α-(perfluorononylthio)propionate. | Cyclohexyl α-(perfluorononylthio)acrylate. |
| Decyl β-chloro-α-(perfluoro-2-propylthio)propionate. | Decyl α-(perfluoro-2-propylthio)acrylate. |

As illustrated by Examples 1B and 3B, α- and β-(perfluoroalkylthio)acrylic acid esters can be hydrolyzed by strong mineral acids to the corresponding free acid intermediates. Table III lists other specific (perfluoroalkylthio)acrylic acid esters and the resulting acids obtained by such a process.

TABLE III.—α- AND β-(PERFLUOROALKYLTHIO)ACRYLIC ACID INTERMEDIATES

| Starting Esters | Products |
| --- | --- |
| Ethyl β-(perfluoroethylthio)acrylate. | β-(Perfluoroethylthio)acrylic acid. |
| Methyl β-(perfluoropropylthio)acrylate. | β-(Perfluoropropylthio)acrylic acid. |
| Phenyl β-(perfluoromethylthio)acrylate. | β-(Perfluoromethylthio)acrylic acid. |
| Decyl β-(perfluoroethylthio)acrylate. | β-(Perfluoroethylthio)acrylic acid. |
| Methyl α-(perfluoromethylthio)acrylate. | α-(Perfluoromethylthio)acrylic acid. |
| Butyl α-(perfluoromethylthio)acrylate. | α-(Perfluoromethylthio)acrylic acid. |
| Ethyl α-(perfluoropropylthio)acrylate. | α-(Perfluoropropylthio)acrylic acid. |
| Phenyl α-(perfluorobutylthio)acrylate. | α-(Perfluorobutylthio)acrylic acid. |
| Cyclohexyl α-(perfluorononylthio)acrylate. | α-(Perfluorononylthio)acrylic acid. |
| Decyl α-(perfluoro-2-propylthio)acrylate. | α-(Perfluoro-2-propylthio)-acrylic acid. |

In addition to the specific α- and β-(perfluoroalkylthio)acrylyl halides illustrated in Examples 1C and 3C, the specific chlorides listed below in Table IV can be prepared from the corresponding acids by treatment with thionyl chloride by the procedures illustrated in the above mentioned examples. The specific α- and β-(perfluoroalkylthio)acrylyl fluorides listed in Table IV can be obtained by treatment of the corresponding acids with sulfur tetrafluoride by the procedure described in U.S. 2,859,245 to W. C. Smith. The specific α- and β-(perfluoroalkylthio)acrylyl bromides and iodides listed in Table IV can be prepared by treatment of the corresponding acrylyl chlorides with hydrobromic and hydroiodic acids, respectively.

TABLE IV.—α- AND β-(PERFLUOROALKYLTHIO)ACRYLYL HALIDES

| Reactants | | Acrylyl Halides |
| --- | --- | --- |
| β-(Perfluoroethylthio)acrylic acid. | PCl₃ | β-(Perfluoroethylthio)acrylyl chloride. |
| β-(Perfluoro-1-propylthio)acrylic acid. | SF₄ | β-(Perfluoro-1-propylthio)acrylyl fluoride. |
| β-(Perfluoromethylthio)acrylyl chloride. | HBr | β-(Perfluoromethylthio)acrylyl bromide. |
| β-(Perfluoroethylthio)acrylyl chloride. | HI | β-(Perfluoroethylthio)acrylyl iodide. |
| α-(Perfluoro-2-propylthio)acrylic acid. | SOCl₂ | α-(Perfluoro-2-propylthio)acrylyl chloride. |
| α-(Perfluorobutylthio)acrylic acid. | SF₄ | α-(Perfluorobutylthio)acrylyl fluoride. |
| α-(Perfluorononylthio)acrylic acid. | PCl₅ | α-(Perfluorononylthio)acrylyl chloride. |

Other specific amides included in the present invention in addition to those illustrated in Examples 2 and 4 are listed in Table V together with the specific α- and β-(perfluoroalkylthio)acrylyl halides and specific amines from which they are prepared.

TABLE V.—α- AND β-(PERFLUOROALKYLTHIO)ACRYLAMIDES

| Reactants | | Amides |
| --- | --- | --- |
| β-(Perfluoromethylthio)acrylyl chloride. | Dimethylamine. | N,N-Dimethyl-β-(perfluoromethylthio)acrylamide. |
| β-(Perfluoroethylthio)acrylyl chloride. | Decylamine. | N-Decyl-β-(perfluoroethylthio)acrylamide. |
| α-(Perfluoro-2-propylthio)acrylyl chloride. | Dibutylamine. | N,N-Dibutyl-α-(perfluoro-2-propylthio)-acrylamide. |
| α-(Perfluorononylthio)acrylyl chloride. | Ethylamine. | N-Ethyl-α-(perfluorononylthio)acrylamide. |
| β-(Perfluoroethylthio)acrylyl chloride. | Ammonia. | β-(Perfluoroethylthio)acrylamide. |
| β-(Perfluoropropylthio)acrylyl chloride. | Ammonia. | β-(Perfluoropropylthio)acrylamide. |

Other specific α-(perfluoroalkylthio)acrylonitriles of this invention which can be prepared from aldehydes and (perfluoroalkylthio)acetonitrile by the process of Example 6 are listed in Table VI together with the specific reactants from which they are prepared.

TABLE VI.—α-(PERFLUOROALKYLTHIO)-ACRYLONITRILES

| Reactants | | Products |
|---|---|---|
| XCHO | $R_fSCH_2CN$ | $XCH=C{\overset{SCF_3}{\underset{CN}{\diagdown}}}$ |
| o-Chlorobenzaldehyde. | Trifluoromethylthioacetonitrile. | α-(Trifluoromethylthio)-β-(o-chlorophenyl)-acrylonitrile. |
| p-Methoxybenzaldehyde. | Perfluoropropylthioacetonitrile. | α-(Perfluoropropylthio)-β-(p-methoxyphenyl)-acrylonitrile. |
| p-Methylbenzaldehyde. | Perfluoroheptylthioacetonitrile. | α-(Perfluoroheptylthio)-β-(p-tolyl)acrylonitrile. |
| 2,4-dibromobenzaldehyde. | Perfluoroethylthioacetonitrile. | α-(Perfluoroethylthio)-β-(2,4-dibromophenyl)-acrylonitrile. |
| p-Cyanobenzaldehyde. | Perfluoroisopropylthioacetonitrile. | α-(Perfluoroisopropyl)-β-(p-cyanophenyl)-acrylonitrile. |
| n-Butyraldehyde. | Trifluoromethylthioacetonitrile. | α-(Trifluoromethylthio)-β-(n-butyl)acrylonitrile. |
| Hexahydrobenzaldehyde. | Perfluoroethylthioacetonitrile. | α-(Perfluoroethylthio)-β-(cyclohexyl)acrylonitrile. |

In addition to the specific β-(trifluoromethylthio)acrylonitrile described in Example 8, other nitriles of this type that can be prepared by the process of that example are listed in Table VII, together with the corresponding acrylamides from which they are prepared.

TABLE VII

| β-(Perfluoroalkylthio)-acrylamides | β-(Perfluoroalkylthio)-acrylonitriles |
|---|---|
| β-(Perfluoroethylthio)acrylamide | β-(Perfluoroethylthio)acrylonitrile. |
| β-(Perfluoropropylthio)acrylamide | β-(Perfluoropropylthio)acrylonitrile. |

In addition to the specific polymers described in Examples 13 and 14, this invention includes homopolymers of all the monomeric α- and β-(perfluoroalkylthio)acrylic acid compounds mentioned above. These homopolymers can have a wide range of molecular weights. Thus, the molecular weights of the polymers may be relatively low, e.g., 1000 or lower, or they can be of intermediate range, e.g., 5000–20,000, or they can be as high as 50,000 or more. The actual molecular weight of the polymer obtained under specific conditions depends on the particular monomers employed and the particular polymerization conditions used.

The polymers of this invention are useful in a wide variety of applications because of the wide range of properties they possess, which properties in turn depend on the molecular weight of the polymer and on the particular substituents on the ethylenic carbons in the monomers from which the polymers are prepared. Thus, the polymers range from viscous liquids and low melting, tacky solids to clear, hard solids. The high molecular weight polymers of this invention can be used to form self-supporting films and the polymers of both low and high molecular weight can be dissolved in organic solvents to form coating compositions for application to surfaces of wood, metal, paper, cloth, and the like.

The monomeric α- and β-(perfluoroalkylthio)acrylic acid compounds of this invention are also useful as solvents for polymers. For example, a 10% solution of low molecular weight tetrafluoroethylene polymer in β-(trifluoromethylthio)acrylonitrile can be made. Application of this solution to a strip of filter paper followed by drying to remove the solvent imparts water repellency to the paper.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula $$XCH=\overset{X}{\underset{|}{C}}-Y$$

wherein:
one X is perfluoroalkylthio of up to 10 carbons and the other is selected from the group consisting of hydrogen, chlorine, bromine, iodine, phenyl, halophenyl and cyanophenyl and alkyl, cycloalkyl and haloalkyl of up to 10 carbons; and Y is selected from the group consisting of —COF, —COBr, —COCl, —COI, —CN, —CONH$_2$ —CONHR and —CONR$_2$, R being selected from the group consisting of phenyl and halophenyl and alkyl and cycloalkyl of up to 10 carbons.

2. β-(trifluoromethylthio)acrylyl chloride.
3. β-(trifluoromethylthio)acrylamide.
4. α-(trifluoromethylthio)acrylyl chloride.
5. α-(trifluoromethylthio)acrylamide.
6. α-(trifluoromethylthio) - β-(p-chlorophenyl)-acrylonitrile.
7. α-(trifluoromethylthio)-β-phenylacrylonitrile.
8. α-(heptafluoropropylthio)-β-phenylacrylonitrile.
9. β-(trifluoromethylthio)acrylonitrile.
10. α-bromo-β-(trifluoromethylthio)acrylonitrile.
11. α-(trifluoromethylthio)acrylonitrile.
12. N,N-dimethyl-β-(trifluoromethylthio)acrylamide.
13. N-(p-chlorophenyl) - β-(trifluoromethylthio)acrylamide.
14. A homopolymer of a monomer of claim 1.
15. A homopolymer of α-(trifluoromethylthio)acrylonitrile.

References Cited by the Examiner

UNITED STATES PATENTS

| 3,040,086 | 6/1962 | Miller | 260—79.7 |
| 3,048,569 | 8/1962 | Harris | 260—79.7 |

JOSEPH L. SCHOFER, *Primary Examiner.*

J. F. McNALLY, *Assistant Examiner.*